Aug. 16, 1932.  M. LEUPOLD  1,871,538
AIRPLANE
Filed April 7, 1931  2 Sheets-Sheet 2
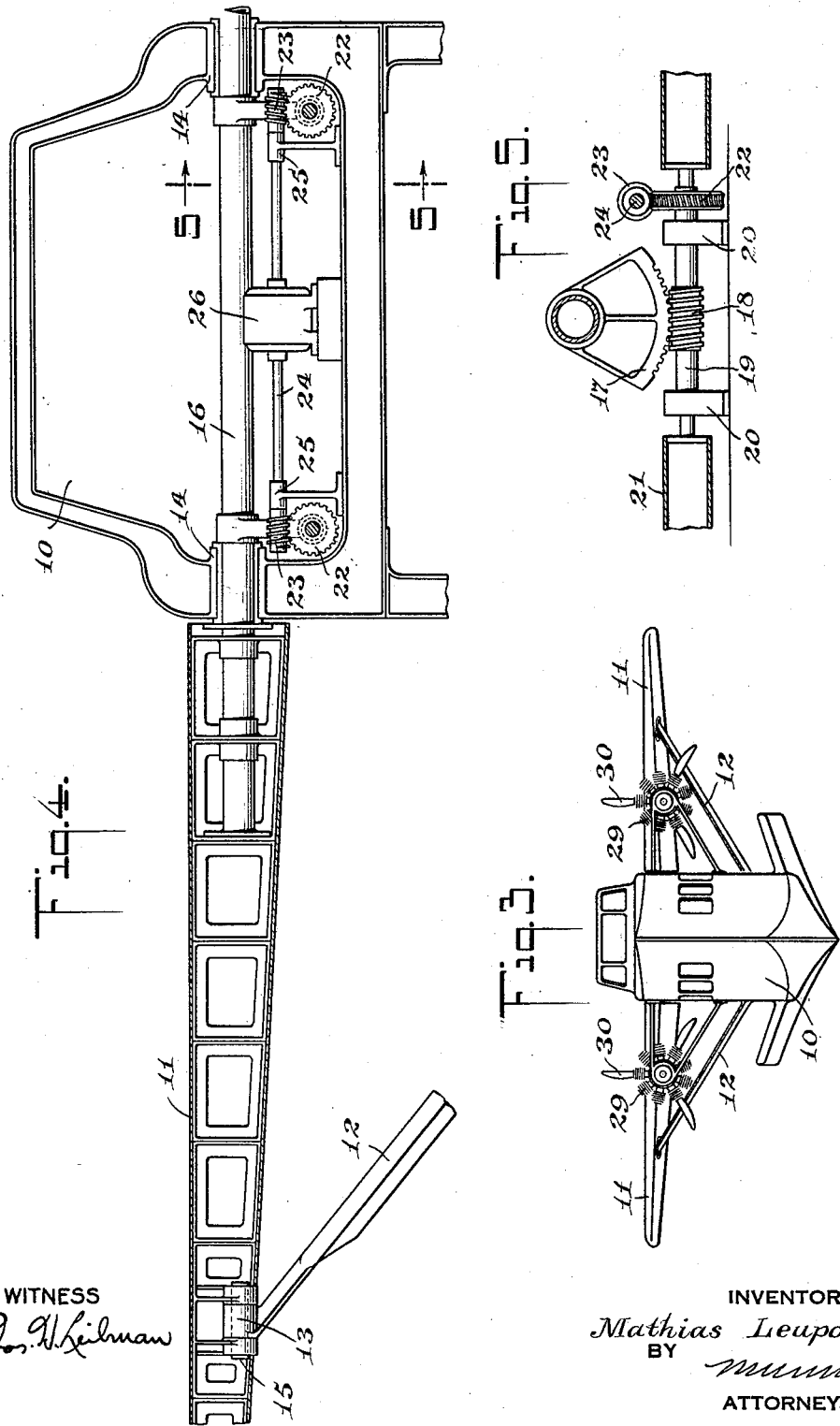
WITNESS
INVENTOR
Mathias Leupold
BY
ATTORNEYS Patented Aug. 16, 1932

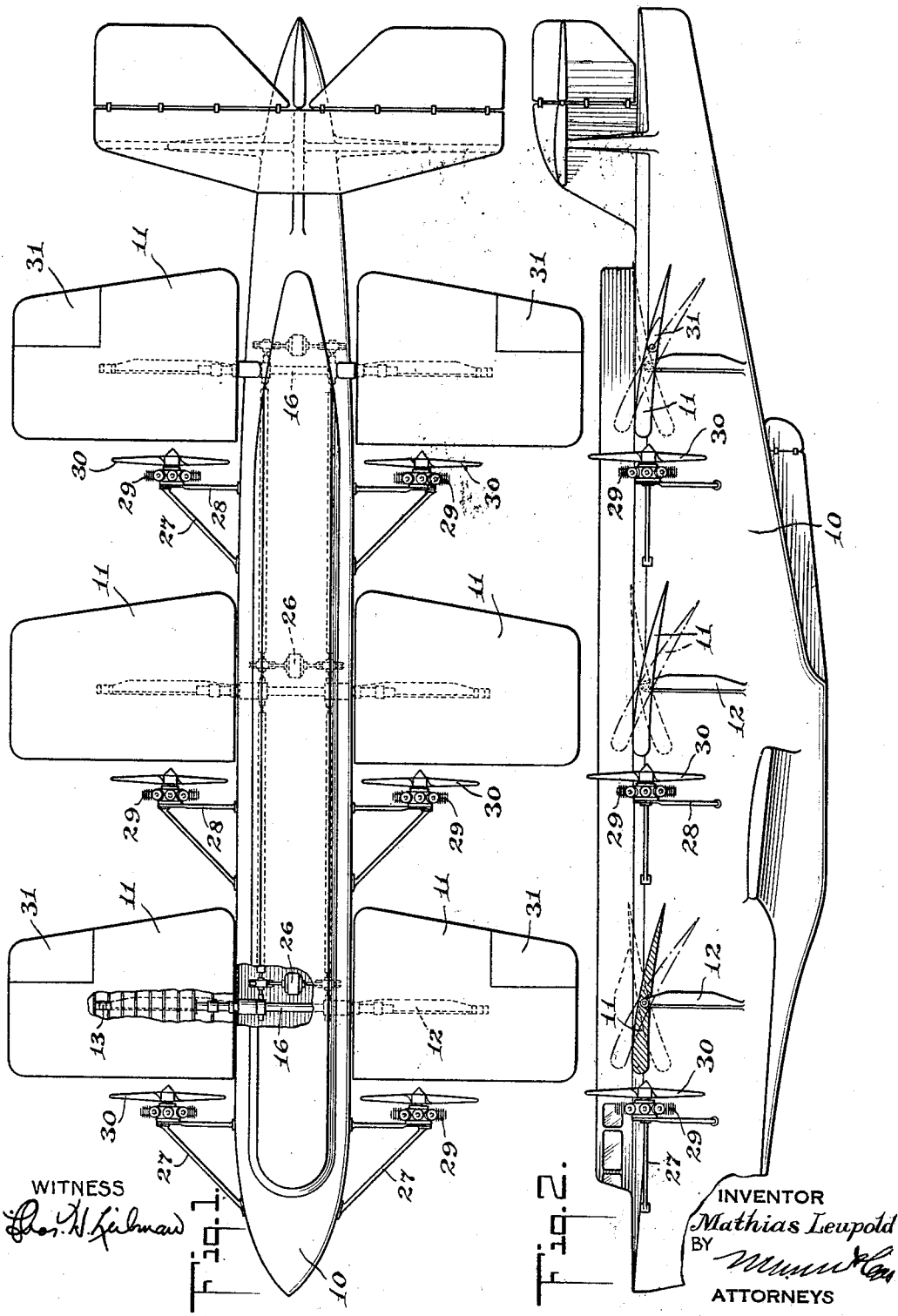

1,871,538

UNITED STATES PATENT OFFICE

MATHIAS LEUPOLD, OF JAMAICA, NEW YORK

AIRPLANE

Application filed April 7, 1931. Serial No. 528,437.

An object of the invention is to provide an airplane having a plurality of wings spaced apart at each side of a fuselage with means to move the wings together in the same direction at any desired angle of incidence and relatively to the fuselage. Preferably there is a plurality of propellers disposed at each side of the fuselage and in front of the wings respectively. With this construction the fuselage will be balanced at all times on an even keel, whether the airplane is flying at a given altitude or is ascending or descending. It is also possible with this construction and arrangement to take off quickly in a small field and also to land quickly and easily.

Another object of the invention is to provide an airplane which is unusually safe in normal operation and also under unexpected and abnormal conditions. This is true not only with airplanes of the size which are now in use, but also with very much larger airplanes. In every case the airplane may take off quickly and also land easily and slowly on an even keel in a relatively small field and may be flown on an even keel at all times and under all conditions.

Additional objects of the invention will appear in the following specification in which the preferred form of the invention is described.

In the drawings similar reference characters refer to similar parts in all the views, of which Figure 1 is a plan view showing the airplane, with parts broken away to illustrate the construction, Figure 2 is a side elevation of Figure 1 with parts broken away to illustrate the construction, Figure 3 is a bow view of the airplane, Figure 4 is an enlarged fragmentary view illustrating the manner of constructing and rocking the wings, and Figure 5 is a sectional view on the line 5—5 of Figure 4.

By referring to the drawings it will be seen that a fuselage 10 is provided and that a plurality of wings is disposed at each side of the fuselage. Preferably six or more wings are provided and when six wings are provided there will be three wings at each side of the airplane, but it will be understood that four or more wings at each side of the airplane may also be employed.

The wings are shown at 11 in the drawings and, as will be later explained, these wings are pivoted on transverse axes to make it possible to fly the airplane on an even keel, and under all conditions, and to assist in landing the airplane and also in the take-off, the airplane being preserved on an even keel during its ascent and descent, as well as in taking off and in landing. It is also possible to land at low speeds with safety.

With the construction as will be described, it is possible to build very much larger airplanes than those which are now in use, and also airplanes which are to carry a very much heavier weight, for the difficulties of taking off and landing are reduced to the minimum and the airplane is under better control at all times.

As will be seen by referring to Figure 4 of the drawings, extending upwardly and laterally from the fuselage 10 there are arms 12 which have lateral bearings 13 at their outer ends, there being bearings 14 in the fuselage which are in alignment with the bearings 13 so that the pins 15 on the wings 11 may be journaled in the bearings 13 and the shaft 16 secured to the inner ends of the wings 11 may be journaled in the bearings 14. It will be understood that each set of wings 11 will be mounted to rotate relatively to the fuselage in the manner described.

Secured to each shaft 16 there are gear sectors 17 which mesh with worms 18 on longitudinally extending shafts 19 journaled in bearings 20 in the fuselage. The shafts 19 are connected by tubular members 21 so that the shafts 19 and the tubular members 21 form continuous, longitudinally extending shaft members. Each of the shafts 16 of each pair of wings 11 is mounted and is connected with the longitudinally extending shaft members in the manner set forth and it will, therefore, be seen that the several pairs of wings 11 will move together relatively to the fuselage 10 to present any desired angle of incidence. Secured to the shafts 19 there are worm wheels 22 which mesh with worms 23 on transverse shafts 24 journaled in bearings 25 mounted in the fuselage.

Connected with each of the shafts 24 there is a motor 26, it being understood that there will be a separate motor 26 for each of the shafts 24 and that each motor 26 may serve to rock the wings 11 in the manner described. Therefore, should one of the motors 26 fail to function, the remaining motor or motors will serve to move the several wings as desired and under the control of the pilot. It will be understood that any other suitable means may be employed to bring about this movement of the wings. For instance, shafts working in a hydraulic ram or cylinder may be used. The means illustrated in the drawings shown only one of many means which may be used to move the wings relatively to the fuselage.

At the sides of the fuselage 10 and in front of the wings 11, there are laterally extending arms 27 and 28 on which engines or motors 29 are mounted for rotating the propellers 30. These propellers 30, as shown in Figures 1 and 2, are disposed immediately in front of the wings 11, there being preferably one motor 29 and one propeller 30 at each wing and the air driven rearwardly by the propellers 30 will engage the surfaces of the wings in a manner readily understood.

When taking off, the pilot will tilt or rock the wings so that the forward ends of the wings will point upwardly and when the propellers 30 are driven by the motors or engines 29, air will be directed by the wings rearwardly and downwardly, which will serve not only to move the airplane forwardly, but will also serve to give a lifting action as the air will be directed against the ground. The forcing of the air against the ground at the several wings 11 will not only serve to move the air plane upwardly, but it will also serve to move the airplane upwardly on an even keel. As the airplane ascends the pilot will decrease the angle of the wings gradually, until he reaches the desired altitude and the desired speed.

It will be understood that a heavy load may be carried by the airplane by maintaining a suitable angle of the wings and that there will be no danger of the airplane going into a tailspin, or losing its horizontal alignment on an even keel.

When the pilot wishes to descend, and provided that there is no need of a sudden landing, the pilot will merely decrease the speed of the engines or motors 29 and, when the airplane is near the ground, the pilot will rock the wings so that their forward edges will point upwardly at a sharp angle and increase the speed of the engines or motors 29 sufficiently to settle the airplane at a very much lower speed and under an air cushion formed by the air from the propellers driven downwardly to the ground by the wings. The sharp angle of the wings will also serve to retard the forward speed of the airplane.

In case the pilot should decide to put the plane into a glide with all engines dead, then the wings will be tilted so as to point the leading edges of the wings downwardly and thus effect a glide, using the momentum of the speed and weight of the plane for propulsion, then, when nearing the ground, the wings will be gradually pointed upwardly, slowly or fast, depending on the speed of the airplane in order to reduce the final speed and furnish an air cushion against the ground and thus land the plane safely at low speed.

It will be understood that while a hydroplane is shown in the drawings, an airplane may be constructed with the wings and propellers as set forth above, or, if desired, an amphibian may be used in connection with the construction described.

Preferably the airplane is provided with ailerons or auxiliary wings 31 which are used in the conventional manner for banking purposes, or otherwise for lateral stability by upward movement on one side respectively downward movement at the opposite side of the transverse axis of the ship. The two ailerons or elevators at the tail end of the plane serve as a longitudinal stabilizer so as to enable the pilot to keep the ship on an even keel when momentarily unbalanced by either moving load balanced within the ship, or by meteorological conditions, or, for instance, in cases where a number of passengers should go up quickly from the front to the rear of the airplane, or vice versa.

As indicated in the drawings, these ailerons, or auxiliary wings 31, are pivoted to the outer edges of the forward and rearward wings 11, but they may be mounted in any desired manner and any desired means may be employed for moving the rearward ailerons or auxiliary wings 31.

With a plurality of wings 11 and a plurality of engines or motors 29 with their propellers 30, it will be obvious that, should one or more of the engines or motors 29 become disabled, it will still be possible for the airplane to proceed in many cases, and in all cases it will be possible for the airplane to make a landing, without upsetting the equilibrium of the airplane.

What is claimed is:

1. An airplane having a fuselage with a plurality of transverse bearings spaced apart longitudinally and longitudinal bearings, a plurality of transverse shafts journaled in the transverse bearings respectively, a plurality of wings secured to the ends of the transverse shafts and at the sides of the fuselage, a longitudinal shaft journaled in the longitudinal bearings, means connecting the last mentioned shaft with the first mentioned shafts, a plurality of power means adjacent the transverse shafts respectively, and means connecting the power means with the longitudinally extending shaft for rotating the latter.

2. An airplane having a fuselage with transverse bearings, a plurality of pairs of arms extending laterally from the sides of the fuselage respectively, the pairs of arms being provided with bearings in alignment with the first mentioned bearings, shafts journaled in the first mentioned bearings respectively, two wings mounted on each of the shafts, one at each side of the fuselage, the wings having members at their outer lateral ends journaled in the bearings on the arms means to rock the shafts and motors, each with a propeller mounted forwardly of the wings respectively between the bearings on the arms and the fuselage.

3. An airplane having a fuselage, a plurality of wings spaced apart at each side of the fuselage, propeller mountings at the sides of the fuselage between the wings, the propeller mountings having parts extending forwardly and inwardly to the fuselage at the rear of the trailing ends of the forward wings, propellers mounted on the propeller mountings adjacent rear wings and spaced from the wings forwardly of the propellers, and means to rock the wings relatively to the propellers and the fuselage.

4. An airplane having a fuselage, a plurality of wings spaced apart at each side of the fuselage, motor mountings at the sides of the fuselage between the wings, the motor mountings having parts extending forwardly and inwardly to the fuselage at the rear of the trailing ends of the forward wings respectively, motors with propellers mounted on the motor mountings adjacent the forward edges of the wings and spaced from the trailing ends of the wings forward of the motors, and means to rock the wings relatively to the motors, the propellers and the fuselage.

5. An airplane having a fuselage with transverse bearings spaced apart longitudinally of the fuselage, a plurality of pairs of arms extending laterally from the sides of the fuselage respectively, the pairs of arms being provided with bearings in alignment with the first mentioned bearings, shafts journaled in the first mentioned bearings respectively, two wings mounted on each of the shafts, one at each side of the fuselage, the wings having bearing members adjacent their outer ends between the upper and lower surfaces of the wings, the wing bearings being journaled in the bearings on the arms respectively, and propellers mounted forwardly of the wings respectively between the bearings on the arms and the fuselage.

6. An airplane having a fuselage with transverse bearings spaced apart longitudinally of the fuselage, a plurality of pairs of arms extending laterally from the sides of the fuselage respectively, the pairs of arms being provided with bearings in alignment with the first mentioned bearings, shafts journaled in the first mentioned bearings respectively, two wings mounted on each of the shafts, one at each side of the fuselage, the wings having bearing members adjacent their outer ends between the upper and lower surfaces of the wings, the wing bearings being journaled in the bearings on the arms respectively, propellers mounted forwardly of the wings respectively between the bearings on the arms and the fuselage, a shaft extending longitudinally of the fuselage, and gearing connecting the last mentioned shaft with the first mentioned shafts for operating all the first mentioned shafts in unison at the same speed and in the same direction.

7. An airplane having a fuselage with transverse bearings spaced apart longitudinally of the fuselage, a plurality of pairs of arms extending laterally from the sides of the fuselage respectively, the pairs of arms being provided with bearings in alignment with the first mentioned bearings, shafts journaled in the first mentioned bearings respectively, two wings mounted on each of the shafts, one at each side of the fuselage, the wings having bearing members adjacent their outer ends between the upper and lower surfaces of the wings, the wing bearings being journaled in the bearings on the arms respectively, a shaft extending longitudinally of the fuselage, and gearing connecting the last mentioned shaft with the first mentioned shafts for operating all the first mentioned shafts in unison at the same speed and in the same direction.

8. An airplane having a fuselage with transverse bearings spaced apart longitudinally of the fuselage, a plurality of pairs of arms extending laterally from the sides of the fuselage respectively, the pairs of arms being provided with bearings in alignment with the first mentioned bearings, shafts journaled in the first mentioned bearings respectively, and two wings mounted on each of the shafts, one at each side of the fuselage, the wings having bearing members adjacent their outer ends between the upper and lower surfaces of the wings, the wing bearings being journaled in the bearings on the arms respectively.

Signed at New York in the county of New York and State of New York this fourth day of April, 1931.

MATHIAS LEUPOLD.